(12) United States Patent
Betsch et al.

(10) Patent No.: US 7,344,312 B2
(45) Date of Patent: Mar. 18, 2008

(54) BEARING SHELL MADE OF HYBRID MATERIAL AND PROCESS FOR PRODUCTION THEREOF

(75) Inventors: Jochen Betsch, Waiblingen (DE); Florian Lampmann, Neu-Ulm (DE); Harald Pfeffinger, Tiefenbronn (DE); Franz Rueckert, Ostfildern (DE); Frank Streicher, Ostfildern (DE); Torsten Wittrowski, Ulm (DE)

(73) Assignee: Daimler AG, Stuttgart (DE)

( * ) Notice: Subject to any disclaimer, the term of this patent is extended or adjusted under 35 U.S.C. 154(b) by 309 days.

(21) Appl. No.: 11/154,108

(22) Filed: Jun. 16, 2005

(65) Prior Publication Data

US 2006/0000095 A1    Jan. 5, 2006

(51) Int. Cl.
*F16C 7/02*     (2006.01)
*F16C 33/12*    (2006.01)
*B21D 53/10*    (2006.01)

(52) U.S. Cl. .............. 384/276; 29/898.059; 384/294; 384/913

(58) Field of Classification Search .............. 384/276, 384/282–285, 291–294, 912, 913; 29/898.042, 29/898.054, 898.058, 898.059
See application file for complete search history.

(56) References Cited

U.S. PATENT DOCUMENTS 2,615,768  A  * 10/1952  Schluchter .............. 384/284
5,433,531  A  *  7/1995  Thompson .............. 384/276
5,484,662  A  *  1/1996  Rao ..................... 428/553
5,766,693  A  *  6/1998  Rao ..................... 427/454
6,234,678  B1 *  5/2001  Tsuji et al. .............. 384/276
6,560,869  B1 *  5/2003  Schlegel et al. ......... 29/888.09
6,802,650  B2 * 10/2004  Yasuda et al. ........... 384/276

FOREIGN PATENT DOCUMENTS

DE     100 35 031 A1    11/2001
DE     100 35 032 A1     2/2002

* cited by examiner

*Primary Examiner*—Thomas R. Hannon
(74) *Attorney, Agent, or Firm*—Akerman Senterfitt; Stephan A. Pendorf; Yonghong Chen

(57) ABSTRACT

Internal combustion engine with bearing shells, which are formed essentially by thermal sprayed bearing layers, wherein the thermal sprayed bearing layers are formed by at least two slide bearing materials with different hardness, which are spatially separated from each other and are provided on the outer surface of the bearing shell, as well as process for production of bearing shells for internal combustion engines including the steps:
 mechanical conditioning of the bearing surface
 coating of the bearing surface with the materials of the bearing shell by thermal spray processes
 finishing flattening processing of the applied layer
wherein as bearing shell at least two slide bearing materials with different hardness were deposited separated spatially from each other, wherein the materials are in contact with each other via interlayers or joint layers.

16 Claims, No Drawings

BEARING SHELL MADE OF HYBRID MATERIAL AND PROCESS FOR PRODUCTION THEREOF

BACKGROUND OF THE INVENTION

1. Field of the Invention

The invention concerns an internal combustion engine with bearing shells (bearing seats, bushings), which are formed of thermal sprayed layers various bearing materials, as well as processes with production of bearing shells for internal combustion engines including the steps: mechanical conditioning of the bearing surface, coating the bearing surface with the material of the bearing shell using arc wire spraying, atmospheric plasma spraying, or high speed flame spraying, and then flattening finishing processing of the sprayed on layer. The invention concerns in particular bearing shells, which are provided on a connecting rod or piston rod.

2. Related Art of the Invention

Bearings in internal combustion engines are, as a rule, slide bearings. The bearing load typically exhibits force in a primary direction. Besides being able to accept force in this primary direction of force, there is also the problem of the embedding of dirt in the bearing material which provides a substantial demand on the slide bearing. Preferably, thus, with respect to the bearing load in the direction of force, a very sustainable bearing layer should be selected and the bearing layer should exhibit tolerance to dirt in the direction of the load. For this, typically a bifurcated bearing shell arrangement is selected, which is formed by two half-shells of different materials introducible into the bearing. These are introduced into the motor structure which is divided for bearing, and which are screwed together with an appropriate bearing play or clearance.

Recently the bearing layers have been applied directly upon the substrate material. Thus, for example, from DE 197 31 625 a connecting rod or piston rod is known, which has a bearing layer with a layer thickness between 150 to 800 μm. The bearing layer is applied by means of thermal spray processes, in particular by plasma spraying, and is comprised of a metal alloy, in certain cases in conjunction with dry lubricants.

From DE 10035032 a process for producing a connecting rod with a bearing layer is known, wherein the bearing layer is preferably applied by means of thermal spray processes, in particular plasma spraying or arc wire spraying, and preferably is comprised of Al/Cu-alloy or Cu/(Zn, Al, Sn)-alloy.

From DE 100 35 031 likewise sliding surfaces obtained by thermal spraying are known. Therein the sliding layers exhibit a gradual change in the composition of the coating with increasing coating layer. Preferably the layer is comprised of CuAl-alloy close to the substrate and, going away from the substrate, with an increasing proportion of titanium oxide.

The known processes lead to bearing layers with an even or gradual characteristic profile over the entire bearing surface.

SUMMARY OF THE INVENTION

It is thus the task of the invention to provide an internal combustion engine with a bearing shell, which can be adapted to the various requirements with respect to sustainability and dirt tolerance according to the local requirements, as well as a process for production of these layers.

The task is solved in accordance with the invention by an internal combustion engine with bearing shells, which are essentially formed by thermal sprayed bearing layers as well as the process for production of bearing shells for internal combustion engines including the steps:

mechanical conditioning of the bearing surface coating of the bearing surface with the material of the bearing shell by means of arc wire spraying, atmospheric plasma spraying or high speed flame spraying flattening finishing processing of the sprayed on layer, wherein the thermal sprayed bearing layers are formed of phases of at least two slide bearing materials with different hardness, which are separated spatially from each other are provided on the outer surface of the bearing shell.

Therewith the thermal sprayed bearing layers are formed in accordance with the invention by phases of at least two slide bearing materials with different hardness, wherein the phases are provided separated spatially from each other. Therein the phases of the at least two slide bearing materials are provided on the surfaces of the bearing shell, so that the corresponding phases are tribologically active in the slide layer.

The material of the inventive bearing layer with a distribution of phases of at least two sliding materials separated spatially from each other is, in the following, referred to as a hybrid material. Therein it is essential that the slide bearing materials are different from each other in their hardness. At least two of the slide bearing materials should be substantially different from each other with regard to their hardness.

By the hybrid material a slide layer is formed, which exhibits the characteristics for a sustainable layer as well as the characteristics of dirt tolerance.

Therein these specific characteristics are determined essentially by the hardness of the corresponding slide bearing materials, wherein the harder components of the hybrid material ensure sustainability and the softer components ensure dirt tolerance. By the combination of materials in a hybrid material the individual characteristics are alternatingly desirably influenced.

In accordance with the invention the adjacent phases of the at least two slide bearing materials are separated from each other by a mixing or micro structure layer or interlayer, which includes the elements of the different slide bearing materials. Thereby a very homogenous transition between the various materials and in particular their physical characteristics is ensured. Likewise, the phases of the various materials are joined very tightly to each other. Therefrom there results also improved bonding to the substrate, which is particularly advantageous under tribologic and temperature changing loads.

The phases of the different slide bearing materials form outer surface structures. Thereby it is achieved that all participating materials are effective also in the tribologic stressed sliding zone.

In a first embodiment of the invention macroscopic surface structures are formed. The term macroscopic structure is intended to mean that the individual phases, in certain cases the structures on the surface, exhibit a flatness greater than approximately 1 mm$^2$ preferably the length and/or the width on the surface is above 5 mm. These structures can have any irregular shape, preferably however rounded, elongate or linear shape.

Preferably the elongate or line shaped embodiments exhibit preferred directions, particularly preferred in concentric circles, spirals, or axial to the center axis of the slide bearing. In this case the length and/or width of the structures lie in the range of the outer dimensions of the slide bearing.

In a further embodiment of the invention, in place of the macroscopic structure, microscopic structures are present. This means, that the various phases form a microscopic mixing interlayer or microstructure. The dimensions of the structures thus typically lie in the range of typical metallic microcrystal-microstructures.

Independent of the geometric design, the slide surface is formed of at least two different slide bearing materials, which differ significantly from each other in their hardness.

The hard slide bearing material is in particular selected from the following types of alloys:
brass, in particular CuZn31Si1,
Al-Bronze for example
Al/Cu-alloys, for example
bronze based on Zn, for example
bronze based on Sn, for example
and/or bronze based on Pb, for example The soft slide bearing materials are in particular selected from the following alloy types:
bronze, for example CuSn6Ag1
white metal (lead-based babbitt) based on Zn, for example
white metal (lead-based babbitt) based on Pb, for example
bronze based on Pb, for example
bronze based on Pb/Sn, for example
Al/Sn-alloys, for example
Pb/Sn-alloys, for example
and/or red brass or bronze, for example The hardness of the inventive selected slide bearing materials lies in the ranges conventional for these materials. Preferably the hardness of the soft slide bearing material at 20° C. is in the range of 20 to 80 HB and the hardness of the hard slide bearing material is in the range of 80 to 200 HB.

In accordance with the invention the slide bearing materials differ with respect to their hardness from each other. Preferably therein the difference in the hardness (reference temperature 20° C.) between the softest and the hardest slide bearing material of the bearing layer is above 30 HB. Particularly preferred is a difference of at least 50 HB.

In the selection of the slide bearing materials it is likewise advantageous when these are formed of a similar or related alloy system. This facilitates a solid joining of the different phases to each other.

A preferred combination is formed by brass of CuZn31Si1 and bronze of CuSn6Ag1.

Depending upon load and situation of application, the ratios of the amounts of the various slide bearing materials may be distributed evenly over the bearing shell or also locally vary and be different. This can mean, for example, that the slide bearing on the side of the force application is formed primarily of the harder slide bearing material and on the other side is formed primarily of the softer material. Over the entirety of the bearing shell the relationship of soft to hard slide bearing material in accordance with the invention lies however at 1:10 to 10:1. Preferably at least the relationship of the hardest to the softest material is close to 1:1, in particular at 0.8 to 1.2.

The outer surface of the bearing shell is typically flattened and can exhibit microchambers, for example cup or channel shaped. Microchambers, which act as a reservoir for accepting liquid lubricants, are in principal known. One inventive embodiment of the surface of the bearing shell envisions that the number or as the case may be surface of the microchambers is selected differently for the softer than for the harder slide bearing materials. Therein the harder material preferably has a higher number of microchambers, wherein the softer material, in certain conditions, may not even exhibit any microchambers.

A further aspect of the invention concerns a preferred process for manufacture for the inventive bearing shells. The process for production of bearing shells for internal combustion engines includes the following steps:
mechanical conditioning of the bearing surface
coating of the bearing surface with the material of the bearing shell by thermal spray processes
flattening finishing processing of the sprayed on layer, wherein, as the most important process feature, at least two slide bearing materials with various hardness are provided spatially separated from each other, wherein the materials are in contact with each other via microstructures or interlayers or mixing joints.

The mechanical conditioning of the surface is typically provided by roughening, for example by sandblasting, water blasting, surface grinding or vibratory finishing or grinding.

For the preferred thermal spray processing techniques, these include arc wire spraying, atmospheric plasma spraying or high speed flame spraying.

Processes of this generic type are known. In a thermal coating of this type, for example a plasma coating, a coating material in particular a metal is supplied to a flame in powder or rod shape, melted therein and spewed against the surface to be coated. Depending upon selected coating material and employed environment temperature, coatings with various characteristics, in particular with desired slide characteristics, hardness characteristics, layer thickness or the like, can be achieved.

In a preferred embodiment of the invention a thermal spray process or, as the case may be a spray device specially adapted therefore, is selected, which makes possible the simultaneous keeping separate of the various slide bearing materials. These include spray processes with multiple spray nozzles. It is likewise also possible in a single nozzle process to employ a powder mixture of various components or various spray wires or also a filler or component wire in the spray process.

The slide bearing material is preferably deposited in a layer thickness in the range of 0.1 to 2.5 mm.

In a further embodiment the bearing shells have introduced therein recesses in the form of microchambers. This can occur according to a conventional process, preferably by means of laser radiation or chemical etching.

The invention claimed is:

1. An internal combustion engine with bearing shells, which are formed essentially of thermal sprayed bearing layers, wherein the thermal sprayed bearing layers are formed of phases of at least two slide bearing materials with different hardness, which are separated spatially from each other and are provided on the outer surface of the bearing shell, wherein the at least two slide bearing materials include hard slide bearing material and soft bearing material, and wherein the adjacent phases of the at least two slide bearing materials are separated by a mixed phase, which includes elements of the at least two slide bearing materials.

2. The internal combustion engine according to claim 1, wherein on the outer surface of the bearing shell, rounded, elongated or linear shaped structures are formed, wherein each structure is formed by one of the at least two slide bearing materials.

3. The internal combustion engine according to claim 2, wherein the surface area of each individual structure is greater than 1 $mm^2$.

4. The internal combustion engine according to claim 1, wherein the hard slide bearing material is selected from a group consisting of brass, Al-bronze, Al/Cu-alloys, bronze based on Zn, bronze based on Sn, and bronze based on Pb.

5. The internal combustion engine according to claim 1, wherein the soft slide bearing material is selected from a group consisting of lead-based babbitt based on Zn, lead-based babbitt based on Pb, bronze based on Pb, bronze based on Pb/Sn, Al/Sn-alloys, Pb/Sn-alloys and red bronze or brass.

6. The internal combustion engine according to claim 1, wherein the difference in the hardness between the softest and the hardest slide bearing material of the bearing layer at 20° C. is above 30 HR.

7. The internal combustion engine according to claim 1, wherein the hardness of the soft slide bearing material is in the range of 20 to 80 HB at 20° C. and the hardness of the hard slide bearing material is in the range of 80 to 200 HB at 20° C.

8. The internal combustion engine according to claim 1, wherein the relationship of the soft to the hard slide bearing material based on volume or surface area in the total bearing shell lies in the range of 1:10 to 10:1.

9. The internal combustion engine according to claim 1, wherein the bearing shell includes microchambers in cup or channel shape.

10. A process for producing bearing shells for internal combustion engines including the steps:
   mechanically conditioning the bearing surface
   coating the bearing surface with materials of the bearing shell by means of thermal spray processes
   flattening finishing processing the sprayed on layer,
   wherein as bearing shell at least two slide bearing materials with different hardness are provided separated spatially from each other in separate regions, wherein the materials are in contact along mixed joint layers, and wherein the adjacent phases of the at least two slide bearing materials are separated by a mixed phase, which includes elements of the at least two slide bearing materials.

11. The process according to claim 10, wherein the thermal spray processing is are wire spraying, wherein at least a filler wire or a component wire is employed, which comprises the various slide bearing materials.

12. The process according to claim 10, wherein a first phase is applied over large surface areas, and a second phase is an embedded laminar structure separated from the first phase.

13. The process according to claim 10, wherein in the depositing, limited regions of the bearing remain essentially uncoated.

14. The process according to claim 10, wherein the slide bearing material is deposited in a layer thickness in the range of 0.1 to 2.5 mm.

15. The process according to claim 10, wherein the conditioning occurs by high pressure water beams or sand-blasting.

16. The process according to claim 10, wherein recesses in the form of microchambers are introduced in the bearing shell by laser radiation or chemical etching.

* * * * *